G. A. GASE.
REFRIGERATING APPARATUS.
APPLICATION FILED JUNE 23, 1915.

1,189,197.

Patented June 27, 1916.
3 SHEETS—SHEET 1.

INVENTOR
George A. Gase
By Albert H. Baker
atty.

G. A. GASE.
REFRIGERATING APPARATUS.
APPLICATION FILED JUNE 23, 1915.
1,189,197.
Patented June 27, 1916.
3 SHEETS—SHEET 2.
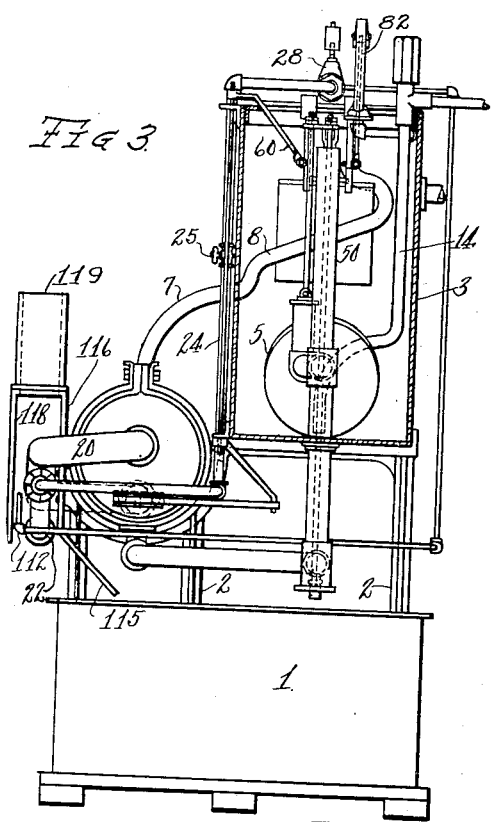
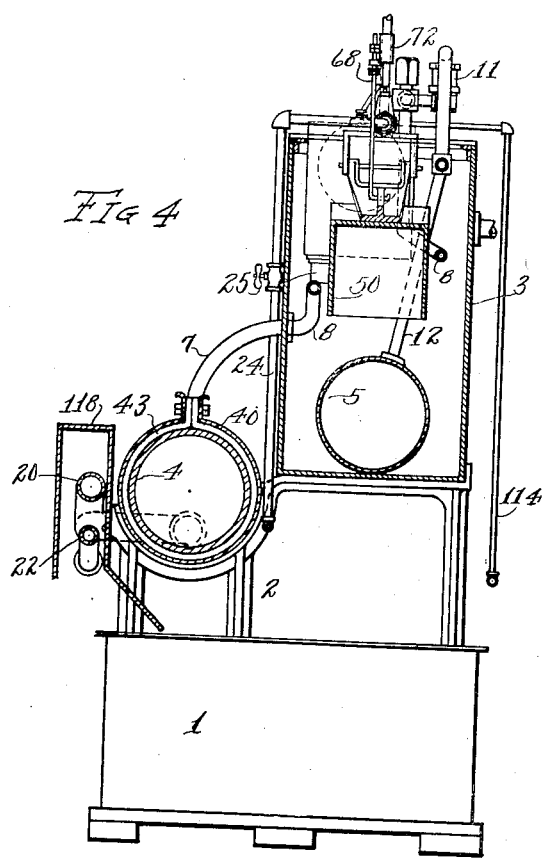
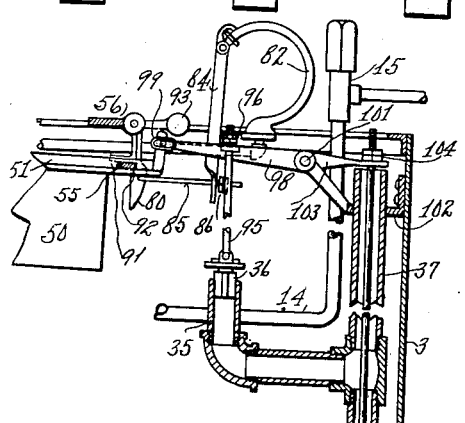
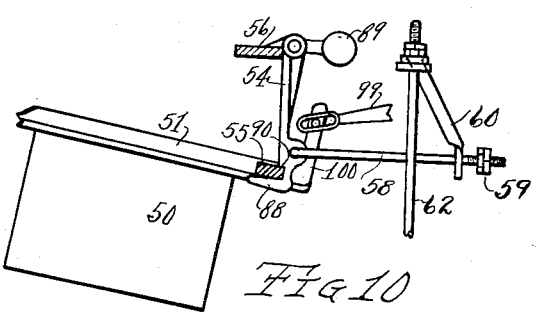
INVENTOR
George A. Gase
By Albert H. Baker
Atty

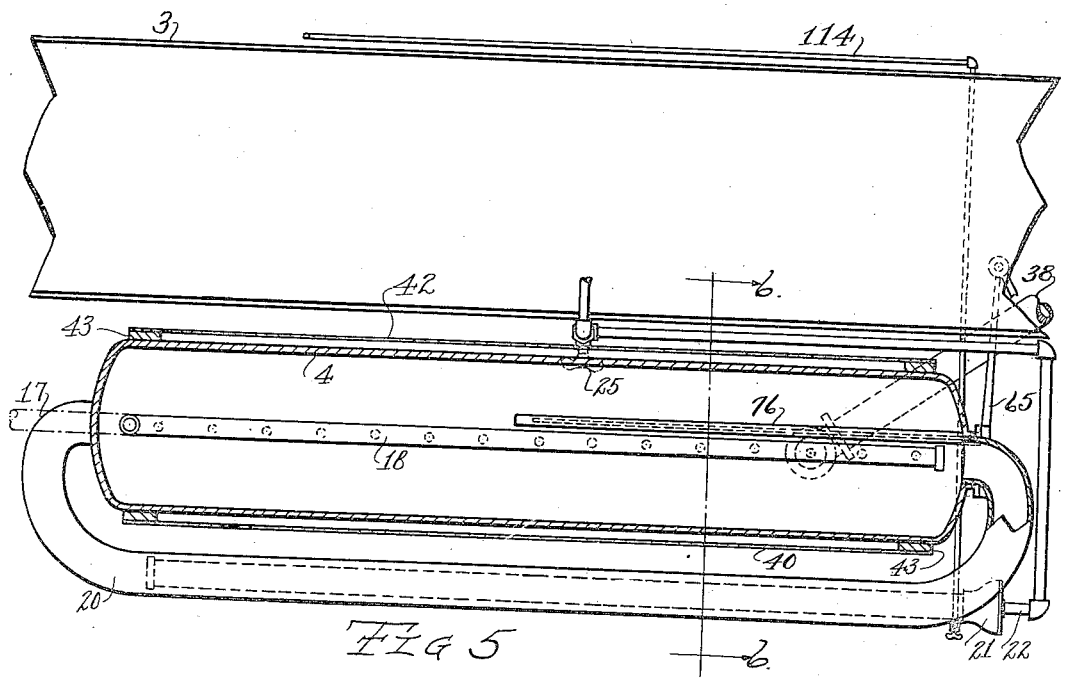
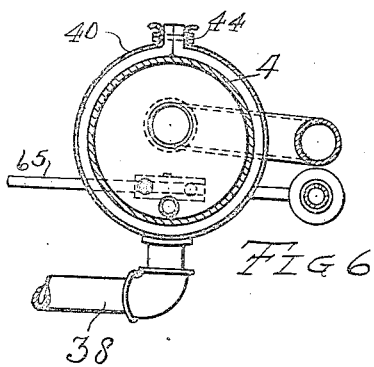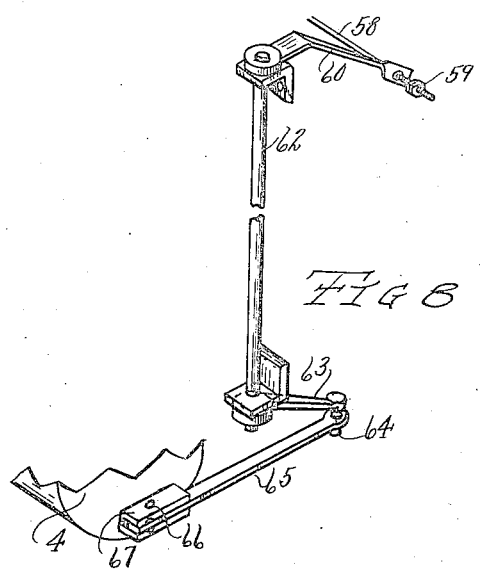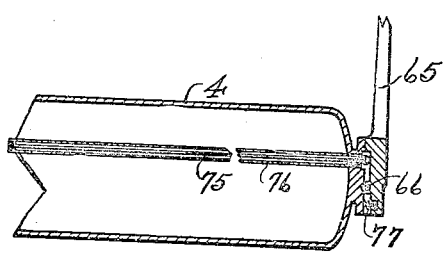

UNITED STATES PATENT OFFICE.

GEORGE A. GASE, OF CLEVELAND OHIO, ASSIGNOR TO THE ICELESS MACHINE COMPANY, OF CLEVELAND, OHIO, A CORPORATION OF OHIO.

REFRIGERATING APPARATUS.

1,189,197.  Specification of Letters Patent.  Patented June 27, 1916.

Application filed June 23, 1915. Serial No. 35,749.

*To all whom it may concern:*

Be it known that I, GEORGE A. GASE, a citizen of the United States, residing at Cleveland, in the county of Cuyahoga and State of Ohio, have invented a certain new and useful Improvement in Refrigerating Apparatus, of which the following is a full, clear, and exact description, reference being had to the accompanying drawings.

This invention relates to refrigerating apparatus of the absorption type and has for its object the provision of a simple efficient apparatus in which one container may act as a generator and an absorber by being alternately heated and cooled, without the heating means interfering with the cooling means.

A more specific object is to so arrange the generator-absorber that a cooling media, such as water, may be made to intermittently surround the same in a body, while the means for heating the liquor in the generator-absorber may be associated with a passageway communicating with the generator-absorber and be comparatively distant from the generator-absorber itself.

Another object is the provision of simple means causing the cooling liquid to flow upwardly around the generator-absorber in conjunction with means for automatically draining the liquid from around the generator-absorber at the termination of the absorption periods.

A further advantage of my invention is that the outside passage, by which the liquid in the generator-absorber is heated, may prevent any superheating of the vapor, because such passage may leave and enter the generator tank below the level of the liquid therein, wherefore a vapor space may be safely left above the level of the liquid within the tank.

The above and other features are hereinafter fully described in connection with the drawings and the essential characteristics are summarized in the claims.

Figure 1:
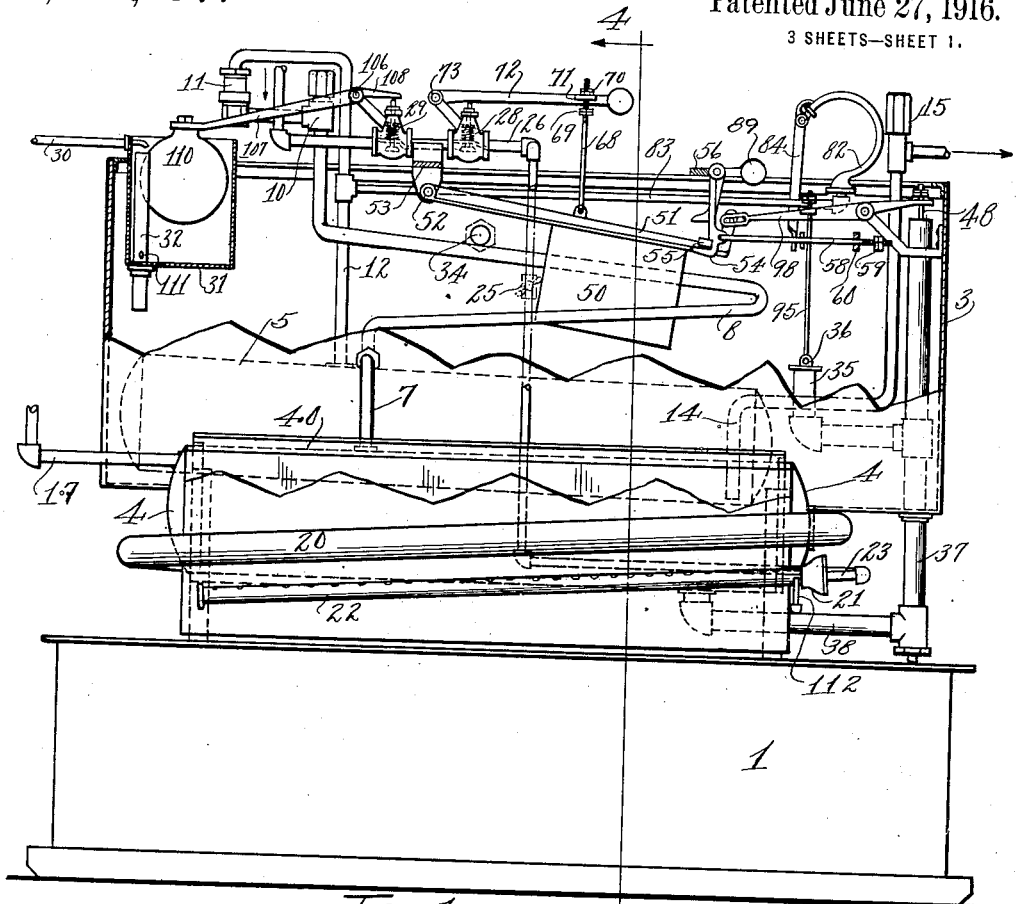
Figure 2:
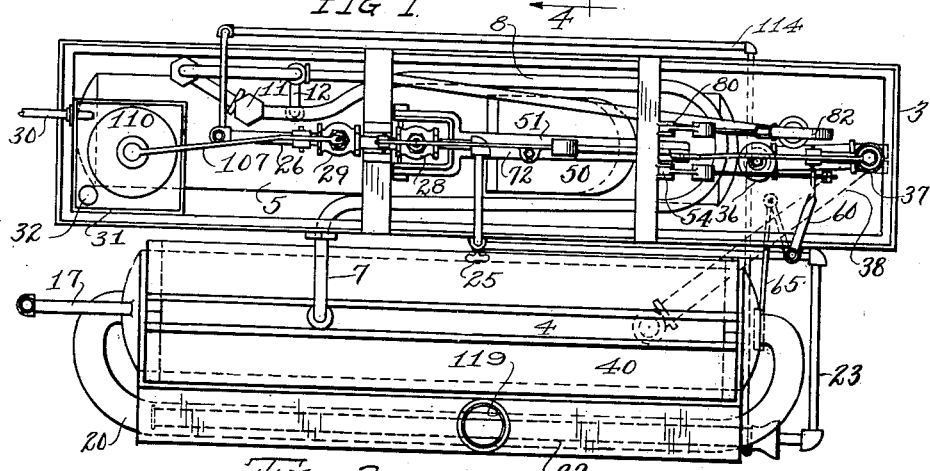

Referring to the drawings, Figure 1 is a side elevation of my refrigerating apparatus partly in section; Fig. 2 is a plan of the same; Fig. 3 is an end elevation thereof showing the end portion of the upper tank removed; Fig. 4 is a vertical cross section through the apparatus taken substantially on the line 4—4 of Fig. 1, but showing the tank beneath the same in elevation for clearness; Fig. 5 is a fragmentary sectional plan on an enlarged scale, showing particularly the arrangement of the outside heating means for the generator; Fig. 6 is a cross-sectional detail through the generator and outside pipe and heating means, taken on the line 6—6 of Fig. 5; Fig. 7 is a horizontal sectional detail on the same scale as Figs. 1 and 2, showing the thermostat in the generator-absorber and its operating arm; Fig. 8 is a detail in perspective of the mechanism operated by the thermostat in the generator-absorber; Fig. 9 is a vertical fragmentary section showing the passages and valves for controlling and leading the cooling water to the generator-absorber; Fig. 10 is a sectional detail showing the weight-and-float motor and one of the latches controlling the same.

Referring to the drawings by reference numerals, my apparatus is preferably mounted over an open topped tank 1 adapted to catch cooling liquid after it has been used, and which liquid if desired may be used repeatedly by mixing it with a cooler fresh supply of water. Above this tank are suitable brackets indicated at 2, carrying a second open topped tank 3 and a generator-absorber drum 4, adjacent the bottom and at one side of this tank. Within the tank 3 is a condenser drum 5.

The generator-absorber drum is adapted to contain ammonia liquor, or like refrigerating media, which may be heated to drive off ammonia vapor through a pipe 7; which leads upwardly from the top of the generator-absorber drum and into the tank 3, where it is formed in a loop 8, so positioned that it may be covered by the water in the tank 3, during the generation period. This loop and pipe 7 slope upwardly so that this passage may act as a rectifier and cause the condensed water vapor to return to the generator-absorber. From this loop the pipe 8 leads upwardly to a manually operated valve 10 and thence to a check valve, indicated at 11. From the check valve 11 the pipe leads downwardly at 12 to the condenser 5, which is shown as positioned in the lower portion of the tank 3, being always below the level of the water contained in that tank.

From a point adjacent to the bottom of the condenser drum, a pipe 14 leads upwardly to a hand-operated valve indicated at 15, and thence to expansion coils, not shown, in the refrigerated area. From the expansion coils the expanded ammonia vapor is returned to the generator-absorber drum by a pipe 17 which is shown as extending along the lower portion of the generator-absorber drum and provided with holes 18 at its under side, whereby the expanded ammonia vapor is caused to enter the liquid in the generator-absorber drum at the lowest portion thereof.

In such an apparatus, during the generation period, the liquor in the generator-absorber drum is heated, driving out the ammonia vapor through the rectifier pipe and to the condenser drum, in which the vapor becomes liquid anhydrous ammonia by reason of the cooling water in the tank 3. When the liquor in the generator-absorber reaches a predetermined degree of desaturation corresponding to a certain high degree of temperature, controlling means actuated by such a condition operate to discontinue the heating and direct cooling water to the outside of the generator-absorber drum. This lowers the temperature in the generator-absorber and causes the weak liquor to absorb the expanded ammonia vapor coming through the pipe 17 from the expansion coils in the refrigerated area, the coils being supplied with liquid anhydrous ammonia from the condenser drum through the pipe 14, as described.

Means for heating the generator-absorber for the period of generation will now be described.

Leading from one end of the generator-absorber drum adjacent the bottom thereof, is a continuous pipe 20, extending outwardly in a curve to a straight portion lying substantially parallel with the drum and laterally separated therefrom and then curving inwardly to communicate with the opposite end of the generator-absorber drum at substantially the middle portion of the end of the drum. This passage is in open communication with the drum 4 and slopes upwardly, preferably at all points, so that the heated liquid therein tending to rise will produce a circulation through this passage and thereby heat the entire body of liquid in the generator-absorber. The means for heating this passage is shown as a gas burner 22, lying substantially parallel with the straight portion of the pipe 20 and immediately beneath the same, and shown as having a suitable mixer 21, to which fuel gas is supplied through a pipe 23, shown as extending around the end of the drum 4 and upwardly at 24, to a hand operated regulating valve 25. A pipe 26, preferably arranged above the tank 3, leads downwardly to the valve 25, from a suitable source of fuel gas supply. In the pipe 26 are shown two controlling valves 28 and 29, each having vertically movable stems adapted to open the valve when depressed and automatically close the valve when released, by reason of springs operating on the stems. One of these two controlling valves, which it will be noted are arranged in series, is dependent for its operation on the supply of cooling media to the apparatus, as will be hereinafter more fully described, while the other valve, indicated at 28, is operated at the beginning of each generating and absorbing period to open and close the valve respectively, by mechanism which will presently be described.

Cooling water for the apparatus is supplied through a suitable pipe indicated at 30, coming first to a small open-top receptacle 31 from which it overflows through a pipe 32, extending upwardly from the bottom of the receptacle to a point adjacent to the top, and through which the water passes to the interior of the tank 3. During the period of generation the water flows from the tank 3 through an overflow opening 34, and preferably passes to the tank 1.

During the absorption period the gas to the burner 22 is shut off and the water in the tank 3 flows through a pipe 35 controlled by a valve 36, to a pipe 37 and the pipe 38, to a lower portion of a jacket 40, surrounding the generator-absorber. As shown this jacket comprises a single piece of sheet metal 42, extending around the cylindrical portion of the drum 4 substantially from end to end thereof and spaced from the drum by rings 43. The rings and jacket are secured at the upper side of the drum by bolts 44, extending through upwardly projecting ends on the bands 43 and upwardly turned flanges on the metal of the jacket. This leaves an open space above the drum from which the water entering the jacket at the lower side may flow, when the jacket is full. Thus it will be seen that as long as water is supplied to the jacket the generator-absorber will be surrounded by a body of cooling water. At the lower portion of the pipe 37 I have shown a valve 46, operated by a vertically movable rod 48 to open and close this valve, acting to cause the water to flow around the jacket or allow the same to drain therefrom, as will be hereinafter described.

The means for controlling the alternations of periods in my apparatus is substantially the same as that shown and described in the patent of H. H. Southworth No. 1,162,316, issued November 30, 1915.

In the particular embodiment shown I have provided a float-and-weight motor indicated at 50, within the tank 3 and comprising substantially an inverted cup carried on an arm 51 pivoted at 52 to a member 53, extending across the top of the tank 3. The float is in the position shown in Fig.

1 during the generation period. The valve 36 is closed, and as the water is overflowing through the opening 34 it will surround the float 50 and tend to cause the same to rise by its buoyancy. The float-and-weight motor is, however, latched down during this period by means of a latch member 54 engaging a cross pin 55 carried on the arm 51 and pivoted at its upper end to a cross member 56 secured to the top of the tank 3.

Attached to the latch 54 is a laterally extending rod 58 carrying nuts 59 forming an abutment for an arm 60, having an eyelet and carried on slidably engaging the rod 58 and carried on the upper end of a rock shaft 62 shown as vertically mounted on the outside of the tank 3. At the lower end of the rock shaft 62 is rigidly mounted a rock arm 63 extending beneath the tank and having a downwardly extending pin 64 engaging an eyelet in the end of an arm 65 pivoted at 66 in a block 67 secured to the end of the generator-absorber drum 4. The arm 65 may be moved in one direction (to the right in Figs. 7 and 8), by a thermostatic rod 75, in a sealed tube 76 extending into the lower portion of the generator-absorber drum and engaging the lever adjacent to the pivot. The lever may be moved in the other direction by a spring 77, within the block 67 and acting on the lever at the opposite side of the pivot 66.

It will be seen that if the arm 65 is swung to the right (Figs. 2, 7 and 8), the arm 60 will be caused to abut the nuts 59, moving the rod 58 and latch 54 to the right, which will release the pin 55, permitting the float 50 to rise by its buoyancy. This movement will operate to shut off the gas to the burner 22 and cause the water to surround the absorber drum.

The means by which the float controls the gas valve 28 comprises a rod 68 having thereon nuts 69 and 70, adapted to engage an eyelet 71 rigid on the lever 72, pivoted at 73 to an arm shown as rising from the body of the valve 28. This lever extends across the stem of the valve and when depressed causes the valve to open. When the float rises on being released, as just described, the nuts 69 engage the ear 71 and raise the lever 72, permitting its stem to rise and shut off the flow of gas through the pipe 26. When the float drops the nut 70 engages the upper side of the ear 71 to draw downwardly on the lever and depress the stem of the valve, thereby opening it.

The float, which is raised by buoyancy at the beginning of the absorption period, is latched up throughout that period by means of a latch 80, shown particularly in Fig. 9, while the water is drained from beneath the same through the pipe 35 and stands substantially level with the top of this pipe throughout this period. The absorption period is terminated consequent upon the complete exhaustion of the liquid anhydrous ammonia from the condenser drum by means of a Bourdon spring pressure - responsive tube, indicated at 82, and connected with the pipe 12 communicating with the condenser by means of a pipe 83. The Bourdon tube is provided with a downwardly extending arm 84, having an eyelet at its lower end to receive a rod 85, pivotally connected to the latch 80, which is pivotally carried by the cross member 56. The complete exhaustion of the liquid anhydrous ammonia from the condenser is followed by a sudden drop in pressure, permitting the contraction of the Bourdon spring tube, which causes the lower end of the arm 84 to swing to the right (Fig. 9), and engage nuts 86 on the rod 85, thereby releasing the latch and allowing the float-and-weight motor to drop.

The downward movement of the weight-and-float motor is limited by the latch pin engaging a hooked lower end 88 of the latch 54. The latch is then swung inwardly by reason of a weight 89 rigid with the latch, causing a comparatively narrow shoulder 90 of this latch to engage the upper side of the pin, thereby latching the float down against the buoying action due to the subsequent rising of the water. The upward movement of the float is limited by a shoulder 91 corresponding to the hooked portion 88, and the float is held in this position by reason of a comparatively narrow shoulder 92, brought under the pin 55 by reason of the weight 93, rigid with the latch.

To cause upward movement of the float to open the valve 36, and thereby direct cooling water to the generator-absorber, I have provided a rod 95 pivoted to the valve member 36 and having at its upper end nuts 96, engaging a laterally extending ear forming an eyelet surrounding this rod and rigidly carried by an intermediately pivoted lever 98. The lever 98 is shown as having a slotted end 99 engaging a pin on an upwardly extending end 100 of the lever 51, carrying the float 50. This lever 98 is pivoted at 101 on an arm of a bracket 102, shown as surrounding the upper portion of the pipe 37 and secured to the inside of the end of the tank 3. One arm 103 of the lever 98 extends over the end of this pipe and is provided with an eyelet loosely engaging the upper end of the rod 48, which is provided with nuts 104, adapted to engage the upper side of the lever arm 103, whereby the valve 46 may be raised and opened when the float member 50 is released and dropped. When the float rises, opening the valve 36, through the connections described, the rod 48 is lowered, closing the valve 46, and the water flowing through the pipe 35 is thereby directed to the pipe 38 and the jacket around the generator-absorber.

While the means for shutting off the supply of gas to the apparatus consequent upon the failure of the water supply may be of any suitable construction, in the present application I have shown the following means: As heretofore stated, the valve 29 in series with the valve 28 in the gas supply pipe has a depressible stem opening the valve when down, and automatically raising to close the valve when released. Pivotally carried at 106, on an arm rising from the body of the valve 29, is a lever 107 having a short arm 108 engaging the valve stem and carrying at the other end a float 110, shown as depending within the water receptacle 31. As long as the water is supplied to this receptacle through the pipe 30, it supports the float 110 in its upper position, depressing the stem of the valve 29 and maintaining it in its open position. When the water through the supply pipe 30 fails, the water in the receptacle 31 drains through a small opening 111 in the pipe 32 near the bottom of the receptacle, thereby allowing the float to drop by its own weight, permitting the stem of the valve 29 to rise and close the valve. As soon as the supply of water is resumed, however, it will be seen that the float will be again raised and the valve opened.

In order that the turning on of the gas may start the heating, I provide a suitable pilot burner 112, adjacent the burner 22. The pilot is constantly burning and receives its supply of gas from the line 26 ahead of the valves 28 and 29, through a pipe 114.

It is desirable that the cooling water overflowing from the jacket 40 should fall on a suitable deflector, indicated at 115, and thereby be directed into the overflow tank 1. It is also desirable to so protect the burner that no water will reach the same at any time. This may be readily accomplished by extending the deflector 115 upwardly between the outside of the tube 20 and the generator-absorber drum, as shown at 116. The fumes rising from the burner may be conducted away by forming a box-like casing 118 over the tube 20, and the burner, (as shown particularly in Figs. 3 and 4), and providing a suitable upwardly extending pipe 119 communicating with this cover.

The complete operation of my apparatus is as follows:

Starting with the generating period, strong liquor in the generator drum is heated by its circulation through the tube 20 over the burner 22, which is supplied with gas through the connections described above, the valves 28 and 29 being open. This heating drives off ammonia vapor through the pipes 7, 8 and 12, to the condenser 5. Water is continually supplied to the apparatus, overflowing from the receptacle 31 into the tank 3 and thereby cooling the condenser, and during the generating period the water level in the tank 3 is determined by the overflow opening 34. The water is maintained at this level by reason of the valve 36 being closed, and the weight-and-float motor is latched in its down position by the latch 54, as described. The generation continues until a predetermined degree of desaturation of the liquor in the generator-absorber is reached, whereupon the thermostatic rod 75 having expanded sufficiently, actuates the arm 65, which, through the arm 63, and rock shaft 62, swings the arm 60 until it abuts the nut 59 and withdraws the latch 54, releasing the float, which rises by its buoyancy.

The rising of the float shuts off the gas through the rod 68 and lever 62, releasing the stem of the valve 28 in the gas supply pipe. At the same time the upward movement of the lever 98 through the rod 95 raises and opens the valve 36 and simultaneously closes the valve 46 in the pipe 37. Consequently the head of water above the top of the pipe 35 at once flows through this pipe 37 and pipe 38 to the jacket 40, surrounding the generator-absorber, overflowing through the opening at the top of the jacket. It will be seen that the result of this is to suddenly surround the hot generator-absorber with a body of cooling water, which flows upwardly around the same quite rapidly until the water level is lowered to the top of the pipe 35. This quickly cools the generator-absorber, causing it to act as an absorber, and thereafter the water supplied through the pipe 30 overflows through the pipe 35 and causes comparatively slow but sufficient circulation of the water throughout the absorption period.

During the absorption period the liquid anhydrous ammonia passes from the condenser through the pipe 14 to the expansion coils, the ammonia vapor returns via the pipe 17 and is absorbed in the weak liquor in the generator-absorber. This operation continues until all of the liquid anhydrous ammonia is exhausted from the condenser drum, whereupon the pressure in the condenser suddenly drops, which allows the Bourdon spring to contract, swinging the arm 84 to the right and releasing the float-and-weight motor, which has been latched up by the latch 80. In dropping the float operates the lever 98 to close the valve 36 and open the valve 46, which drains the water from the jacket around the generator-absorber and allows the water to accumulate above the valve 36 and rise in the tank 3, to the draining opening 34. This downward movement of the float opens the valve 28, permitting the gas to flow to the burner, which is lighted by the pilot and the generating cycle is again resumed.

It will be noted from the construction and arrangement of the generator-absorber that I have provided a jacket by which a body of cooling water may be made to surround the same, and I have provided means for heating the liquor in the generator-absorber arranged in such a manner that it is not affected in any way by the cooling water, and it will be further noted that when the level of the liquor in the generator-absorber is normally above the upper end of the passage 20, ammonia vapor will not form within the passage above the burner. This is a valuable feature, for if the ammonia vapor is allowed to form in the immediate proximity of the burner it becomes super-heated and may suddenly rise to dangerous pressure or become dissociated, forming gas not readily absorbed. Furthermore, it will be noted that I have provided a simple and efficient means for controlling the gas supply by valves which are arranged in series, one of them being operated by the mechanism for reversing the cycles and the other dependent for its operation on the supply of cooling water.

Having thus described my invention, what I claim is:

1. In a refrigerating apparatus, the combination with an absorber and a condenser, of a tank for cooling water surrounding the condenser, means for supplying water to the tank, a jacket adapted to hold water about the absorber, a passage leading from said tank to said jacket, means for closing said passage allowing water to accumulate in said tank, and means for opening said passage whereby the accumulated head of water may flow to the absorber.

2. In a refrigerating apparatus, the combination of a substantially horizontal generator-absorber, a jacket for cooling water nearly surrounding the generator-absorber but leaving an open space along the top thereof, means comparatively distant from the generator-absorber for heating the liquid therein, and means for supplying cooling water to the jacket from the bottom thereof upwardly without encountering the heating means.

3. In a refrigerating apparatus, the combination of a substantially horizontal generator-absorber, a water jacket comprising rings surrounding the generator-absorber and a shield clamped about the rings but leaving an open space at the top, a passage for feeding water to the jacket from below, means in said passage for draining water from the jacket, means for controlling the alternation of the periods in each cycle of the operation, and means actuated thereby for controlling said water feeding and draining means.

4. In a refrigerating apparatus, the combination of a generator-absorber, means for heating the liquid therein, a jacket about the same, a passage supplying water to said jacket from below while the water overflows at the top, means controlling the admission of water into said passage, a valve for draining the water from the passage and jacket, means for controlling the alternations of periods in the apparatus, and means operated by the last mentioned means for opening the admission means for said passage and closing said valve consequent upon one operation of the controlling means, and closing said admission means and opening the valve consequent upon the other operation of the controlling means.

5. In a refrigerating apparatus, the combination with a generator-absorber, of a water jacket around the generator-absorber, means for supplying cooling water to the generator-absorber jacket, an admission valve to said jacket, a draining valve from said jacket, means for opening one of said valves when the other is closed comprising a pivoted lever having opposite arms connected with said valves, and means controlling the periods of operation of the apparatus operatively connected with said lever.

6. In a refrigerating apparatus, the combination with a generator-absorber and a condenser, of a tank for cooling water surrounding the condenser, means for supplying water to the tank, a jacket for the generator-absorber, and a passage leading from said tank to said jacket, means for closing said passage allowing water to accumulate in said tank, means for opening said passage whereby the accumulated head of water may flow to the generator-absorber, and means relatively distant from the generator-absorber for heating the same.

7. In a refrigerating apparatus, the combination with a generator-absorber and a condenser, of a water jacket around the generator-absorber for cooling the generator-absorber, means for supplying water for cooling the condenser and the generator-absorber, a passage leading to the generator-absorber jacket from below, a draining valve in said passage, an admission valve for said passage, means for opening one of said valves when the other is closed comprising a lever having an arm connected with each of said valves, and means controlling the periods of operation of the apparatus operatively connected with said lever.

8. In a refrigerating apparatus, the combination with a generator-absorber, and a condenser, of a tank for cooling water surrounding the condenser, means for supplying water to the tank, a jacket for the generator-absorber, and a passage leading from said tank to said jacket from below, means for closing said passage allowing water to accumulate in said tank, and means for opening said passage whereby the accumulated head of water may flow to the generator-absorber, causing a body of water to surround the same flowing from the bottom upward.

9. In a refrigerating apparatus, the combination with a generator-absorber comprising an oblong closed tank, of two bands around the tank respectively near the ends thereof, and a jacket comprising a sheet-like member wrapped around said tank and spaced therefrom by said bands, the edges of said sheet member being separated at the top for overflowing water, and means for supplying cooling water to said jacket from below.

10. In a refrigerating apparatus, the combination of a generator-absorber, means for heating liquid therein comprising a burner, a pipe for supplying combustible fluid thereto, a valve in said pipe having a depressible stem, a spring tending to raise said stem to close the valve, a lever for depressing said stem, a tank, a weight-and-float motor in the tank, and means connecting said weight-and-float motor and said lever for operating the lever in either direction, whereby said valve may be opened when the motor is in one position and closed when it is in the other.

11. In a refrigerating apparatus, the combination of a generator-absorber, means for cooling the same, means for heating the same comprising a burner, a pipe for leading fuel thereto, an open tank for receiving water having a draining opening comparatively small with relation to the supply of water so that under normal conditions the water level stands above the bottom, a float in said tank, a valve in the fuel supply pipe tending to close and having a depressible stem, a lever connecting said float and valve stem and adapted to depress said stem to open the valve when the float rises, whereby upon the failure of the water supply the water in the tank will drain through said draining opening permitting the float to drop, resulting in the fuel supply being shut off.

12. In a refrigerating apparatus, the combination of a generator-absorber, means for supplying cooling water to the apparatus, means for heating the generator-absorber including a fuel supply pipe, two valves in series in the fuel supply pipe, a weight-and-float motor for operating one of said valves, a tank for receiving a supply of water having a draining opening comparatively small in proportion to the supply, a float in the tank, and means connected with the float for operating the other of said valves.

In testimony whereof, I hereunto affix my signature.

GEO. A. GASE.